UNITED STATES PATENT OFFICE.

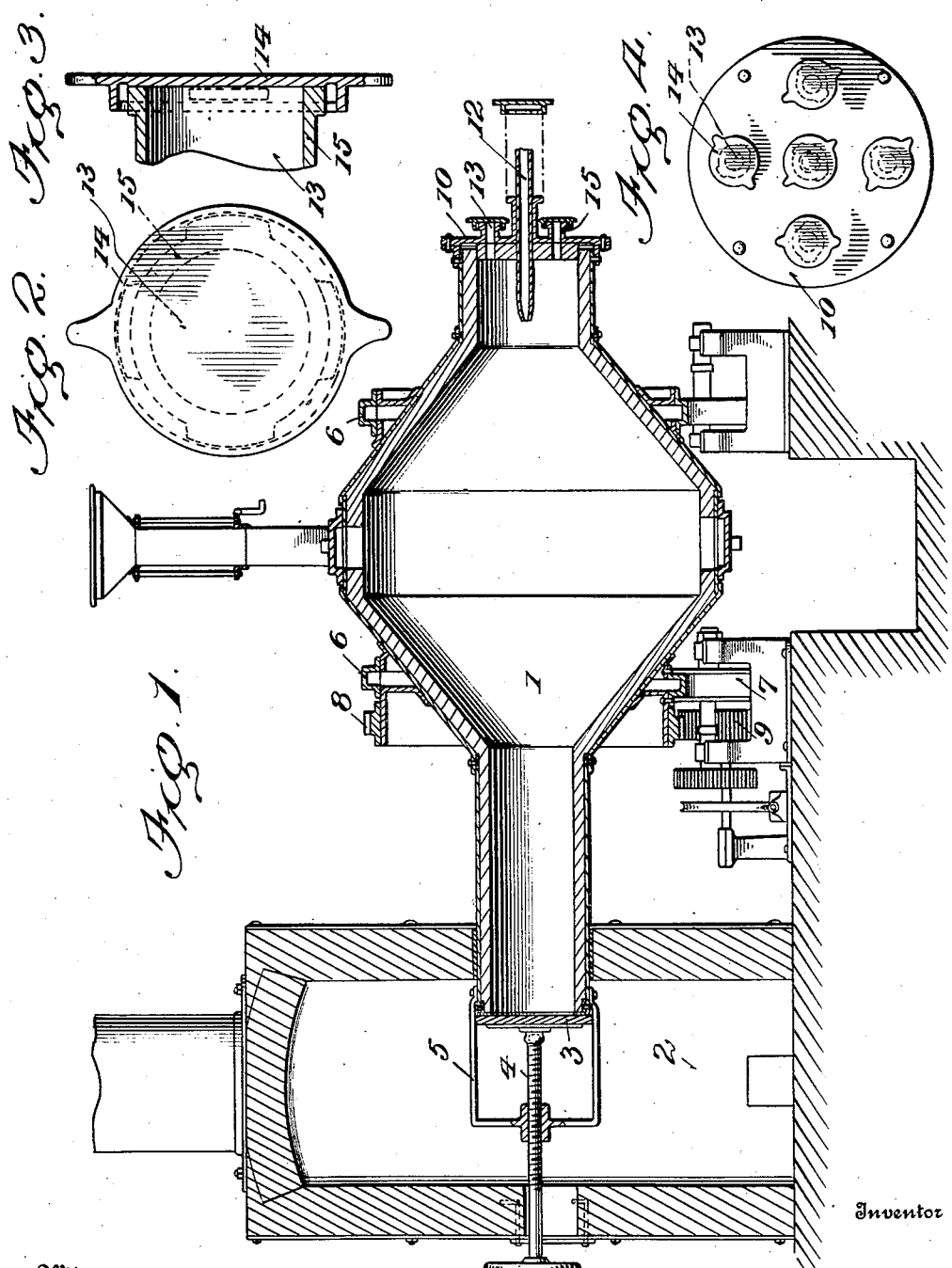

OLIVER B. DAWSON, OF EL PASO, TEXAS, ASSIGNOR TO AMERICAN REDUCTION & REFINING COMPANY, OF NEW YORK, N. Y., A CORPORATION OF SOUTH DAKOTA.

METALLURGICAL PROCESS.

936,095.   Specification of Letters Patent.   Patented Oct. 5, 1909.

Application filed November 16, 1908. Serial No. 462,879.

*To all whom it may concern:*

Be it known that I, OLIVER B. DAWSON, of El Paso, in the county of El Paso and State of Texas, have invented certain new and useful Improvements in Metallurgical Processes; and I do hereby declare the following to be a full, clear, and exact description of the invention, such as will enable others skilled in the art to which it appertains to make and use the same.

The object of this invention is to produce a simple and highly efficient process for reducing minerals to metals.

Specifically it contemplates an improvement upon the metallurgical process covered by Letters Patent of the United States No. 829,575, issued to me August 28, 1906.

The invention will be hereinafter fully set forth and particularly pointed out in the claims.

In the above noted patent I disclosed a process of reducing minerals and ore to metal of the non-carbid group without the use of flux and at a temperature below the temperature of fusion of such metal by the reduction action of finely divided carbon and the nascent carbon monoxid produced at the instant of reduction of the by-product gas, carbon dioxid, in the absence of air.

The furnace must be internally heated to the critical temperature of reduction. The ground sulfid ores will be first desulfurized by the application of an oxidizing flame and a limited introduction of heated air currents. Combustion is increased until the ore body reaches a temperature of approximately 1400° F. Thereupon the furnace is closed as against the entrance of air, and the charge is ready for the reduction agent. According to my present invention I use as this reduction agent carbon monoxid which I have found to be the principal reducing agent when brought into contact with the incandescent ores in the absence of all air. This is due to its power of penetrating the mass, and by taking the oxygen from the mineral the mineral molecules are broken, leaving metal particles and gangue. This gas may be introduced in any suitable manner.

It is immaterial how the carbon monoxid is produced, nor is it essential that it should be the only gas introduced to the incandescent ores. Preferably I use water-gas, the proportion of hydrogen present in the latter being in nowise detrimental, but on the contrary is beneficial, but to what extent is problematic.

After the mineral has been reduced to a metallic state the furnace is again opened up and the heating agency re-applied. A charge of granular carbon, preferably coke-dust, is introduced into the furnace. This commingles with the gangue and metal particles and very materially assists in quickly raising the temperature up to the fusion point of such particles, the carbon serving to continue the reduction throughout the mass. In this way the particles of metal are fused and so condensed as to prevent their floating during the subsequent water concentration, and all loss is avoided.

The apparatus shown and described in my before noted patent may be employed for carrying out the process, but preferably when slightly modified, as shown in the accompanying drawing wherein—

Figure 1 is a vertical longitudinal sectional view. Fig. 2 is an enlarged end view of one of the port closures. Fig. 3 is a cross-sectional view thereof. Fig. 4 is a face view of the firing end.

As pointed out in my before noted patent, the furnace shell 1 is brick-lined and at one end opens into the dust chamber 2, which end may be tightly closed by a cap 3 which is manipulated by a screw rod 4 mounted in bracket 5, the latter serving as a guide for the cap. The shell is shown as having flanges 6 which bear on rollers 7, and also as having a circular rack bar 8 which is driven by gear 9 of the operating machinery. The firing end has a cap-plate 10 through which the gas-supply pipe 12 is centrally passed, and this pipe is surrounded by a circular series of air ports 13, each of which, as well as the port of the gas pipe, may be tightly closed by caps 14 having flanges for locking on circular walls 15 surrounding the several ports.

I claim as my invention:—

1. The herein-described process of immediate reduction of ores of metal which do not form carbids, consisting in heating the ores to incandescence subjecting the incandescent ores, at a temperature below the fusion or volatilizing point of the contained metal, to the reducing action of water-gas in the absence of air and flux.

2. The herein-described process of immediate reduction of ores of metal which do not form carbids, consisting in heating the ores to incandescence subjecting the incandescent ores, at a temperature below the fusion or volatilizing point of the contained metal, to the reducing action of carbon monoxid in the absence of air and flux, and then introducing granular carbon into the incandescent mass after reduction, and then heating the same to the temperature of fusion of the metal.

In testimony whereof, I have signed this specification in the presence of two subscribing witnesses.

OLIVER B. DAWSON.

Witnesses:
FRANCIS S. MAGUIRE,
JOHN A. MURPHY.